G. H. REED.
WHEEL RIM.
APPLICATION FILED OCT. 8, 1917.
1,259,284. Patented Mar. 12, 1918.
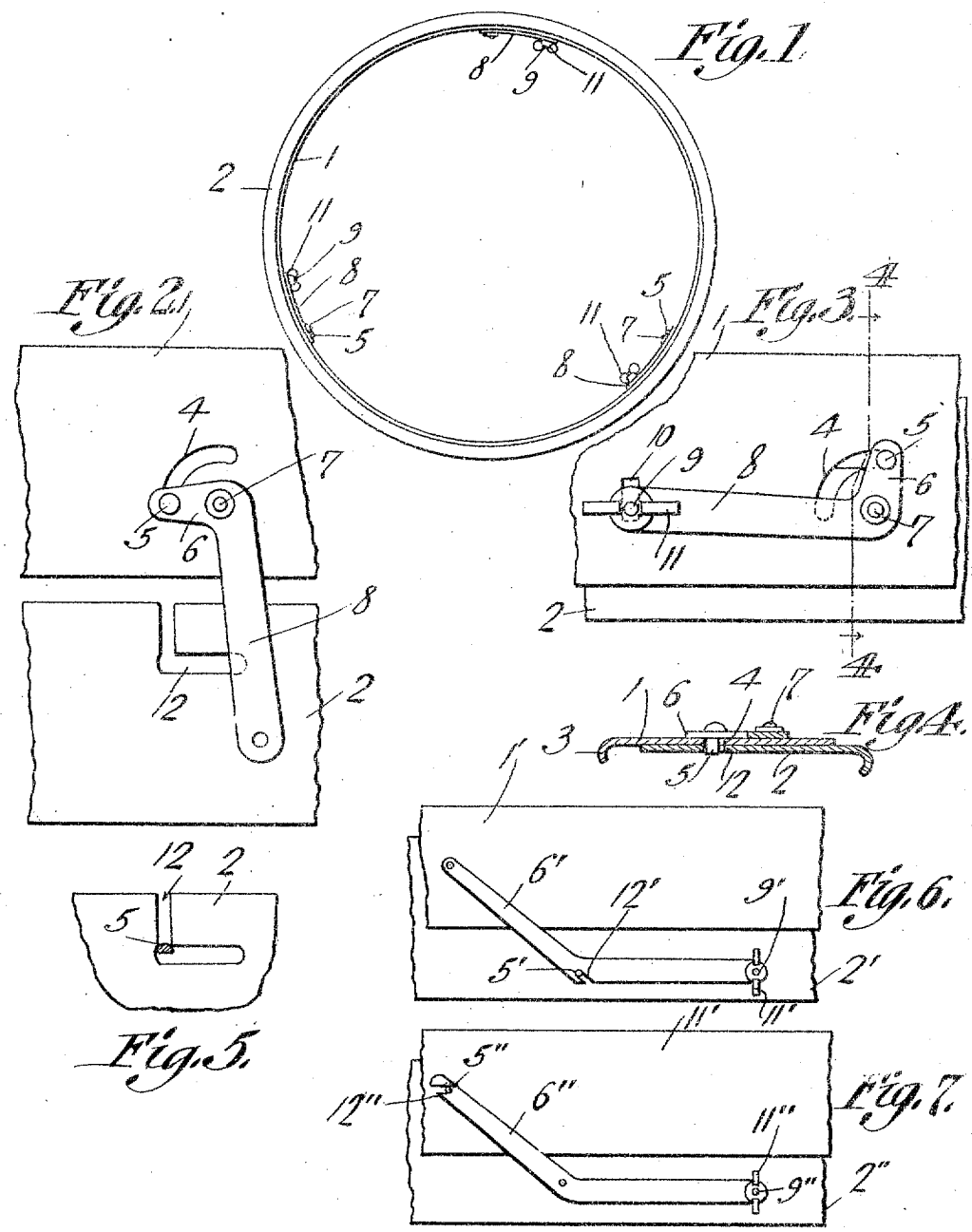

UNITED STATES PATENT OFFICE.

GEORGE H. REED, OF BARNEVELD, WISCONSIN.

WHEEL-RIM.

1,259,284.

Specification of Letters Patent.

Patented Mar. 12, 1918.

Application filed October 8, 1917. Serial No. 195,402.

*To all whom it may concern:*

Be it known that I, GEORGE H. REED, a citizen of the United States, residing at Barneveld, in the county of Iowa and State of Wisconsin, have invented a new and useful Wheel-Rim, of which the following is a specification.

The subject of this invention is a wheel rim, and the objects of the invention are, first, to provide a rim which will clamp a demountable rim in place, or which may be used as a demountable rim to clamp a tire in place, second, to provide means for quickly clamping the rim or unclamping the same and for locking the rim in clamped position, third, to provide means for preventing accidental unclamping of the rim, fourth, to provide a simple and efficient rim.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

Practical embodiments of the invention are shown in the accompanying drawing, wherein:

Figure 1 is a side elevation of a rim constructed in accordance with the invention;

Fig. 2 is a plan view of the locking lever in unlocked position, a fragment of the rim being shown;

Fig. 3 is a similar view of the lock in closed position;

Fig. 4 is a sectional view taken on the line 4—4 of Fig. 3;

Fig. 5 is a fragmentary detail illustrating the interrelation of the locking pin and slot;

Fig. 6 is a plan view of another form of locking lever, shown in locked position;

Fig. 7 is a similar view of still another form of locking lever.

Referring to the drawing by numerals of reference:

The rim is a sectional channel rim, and consists of a stationary or rigidly affixed section 1 which forms the inner half of the rim, and a movable or demountable section 2 which forms the outer half of the rim and which is adapted to encircle and partly overlie the section 1 with a close sliding fit.

The section 1 is formed with an outturned flange 3 along its inner edge, the flange being slightly curved, as seen most clearly in Fig. 3, to present a gripping member for holding a demountable rim in place. The section 1 is provided at suitable intervals with arcuate slots 4 through which project and in which slide pins 5 which are secured to arms 6 of bell crank levers. The bell crank levers are pivotally secured to the section 1 by pins or rivets 7 and their arms 8 are apertured adjacent their free ends to receive the studs 9 which are slidably mounted in slots 10 formed in the said section 1. The studs 9 are threaded to receive wing nuts 11 which lock the bell crank levers firmly in place.

The rim section 2 is provided at suitable intervals with preferably right angled open slots 12 the open branches of which, extending transversely of the section, are somewhat narrower than the longitudinally extending portions.

The pins 5 are flattened at one side, as seen most clearly in Fig. 5, so as to pass freely through the transversely extending portions of the slots 12 when the levers are thrown to unlocked position. As will be seen from Fig. 5 the diameter of each pin 5 is greater than the width of the transverse portions of the grooves 12. This effectually prevents unlocking of the parts while the levers are in locked position which might otherwise result from creeping of the section 2.

In the modification shown in Fig. 6, the arm 6' of a bent lever is pivotally secured to the section 1' and is provided at its elbow or bend with an open slot 12' which is formed with an enlarged circular end and is adapted to receive a pin 5' which is secured to the rim section 2' and is in all respects similar to the pin 5. A stud 9' may be secured to the section 2' and enter the apertured end of the lever 6'. A wing nut 11' may be threaded on the stud for the purpose of binding the parts in place.

In Fig. 7 the modification shown is similar to that just described except that the bent lever 6" is pivotally secured, at its bend, to the section 2″ and on one end has an open slot 12″ which receives the pin 5″ which pin is secured to the section 1″.

From the foregoing the operation of the device is readily apparent.

Having thus described the invention, what is claimed as new and sought to be protected by Letters Patent, is:

1. A wheel rim, comprising separable sections, levers secured to one section and operable to successively separate the sections and draw them together, means for locking the levers, and means for locking the movable section to the levers.

2. A wheel rim, comprising separable sections, one of said sections provided with open slots, pins carried by the other section and adapted to enter the slots, levers secured to one section and operable to successively separate the sections and draw them together, and means for locking the levers.

3. A wheel rim, comprising separable channel sections, one of said sections provided with open slots, levers pivoted to the other section, pins on the levers and adapted to enter the slots, and means for locking the levers in closed positions.

In testimony that I claim the foregoing as my own, I have hereto affixed my signature in the presence of two witnesses.

GEORGE H. REED.

Witnesses:
 D. D. SHEA,
 J. J. SCHULT.